March 19, 1940.  C. L. COBB  2,194,161
FOLDABLE TRICYCLE
Filed Jan. 14, 1939  2 Sheets-Sheet 1
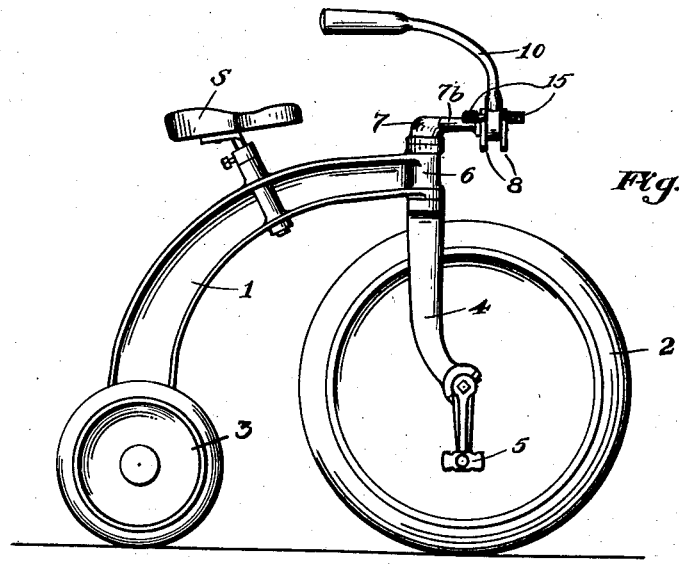
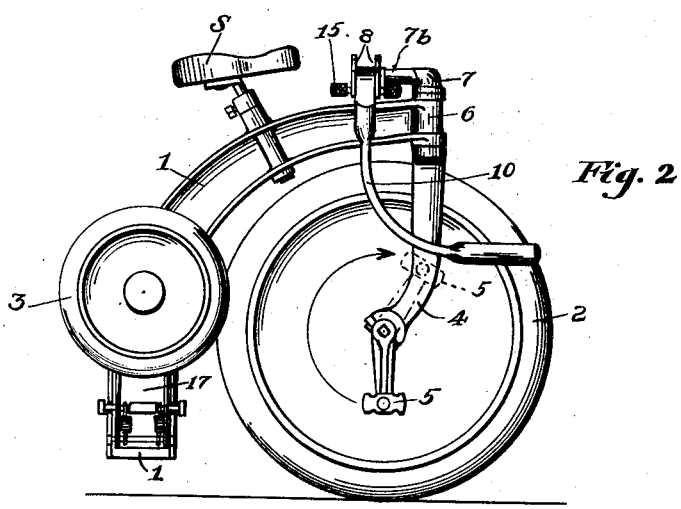
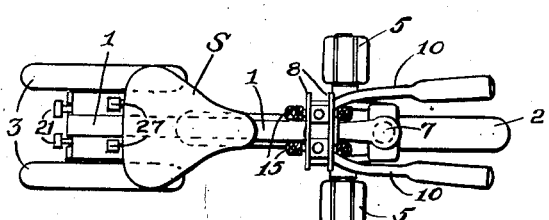
Inventor,
Chester L. Cobb.
BY Henry L. Chenery,
Atty.

March 19, 1940.  C. L. COBB  2,194,161
FOLDABLE TRICYCLE
Filed Jan. 14, 1939   2 Sheets-Sheet 2
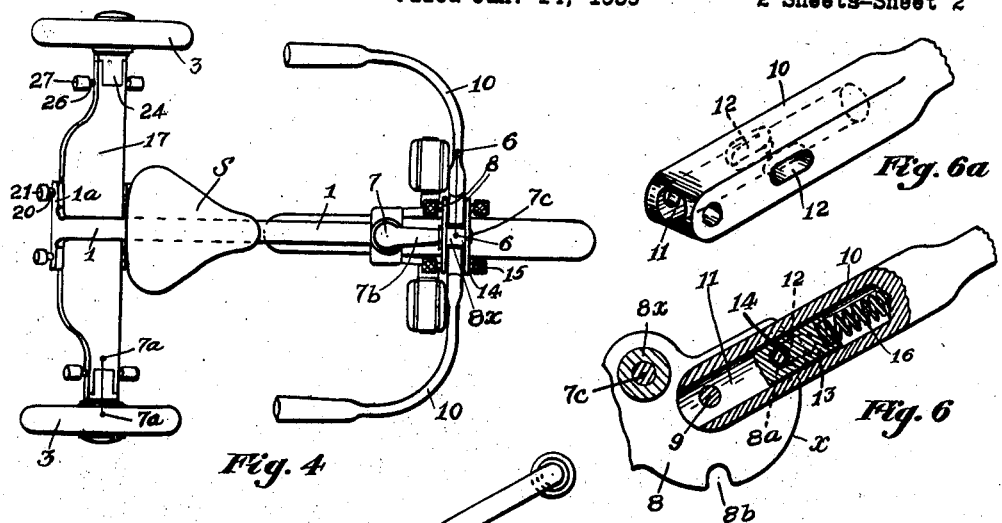
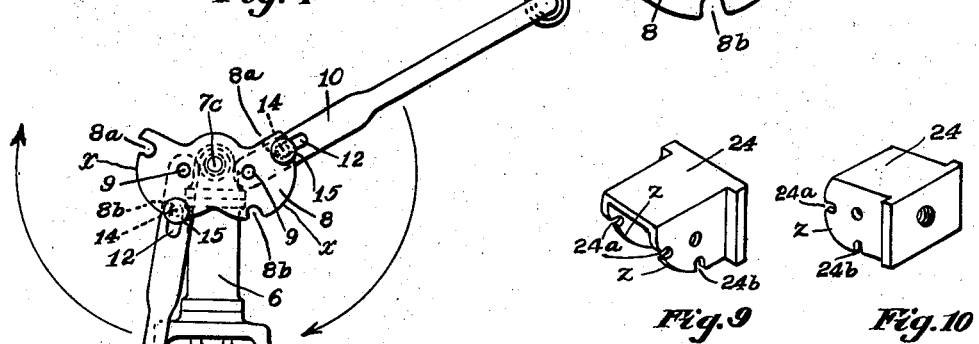
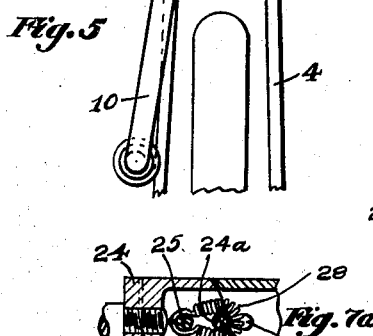
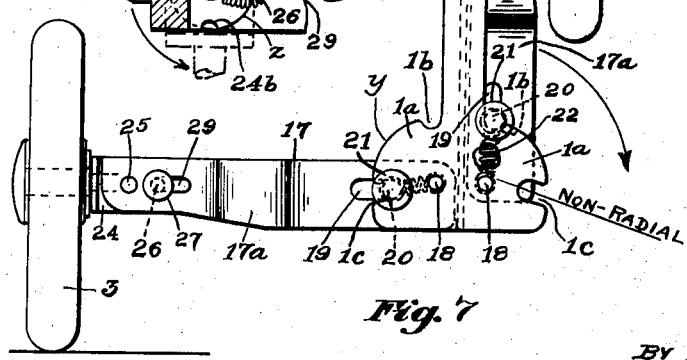
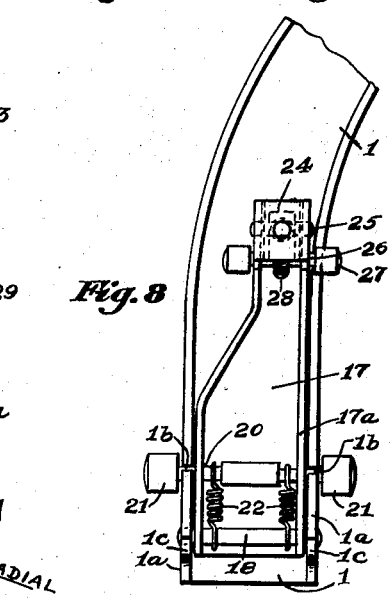
Inventor,
Chester L. Cobb.
By Henry L. Chenery
Atty.

Patented Mar. 19, 1940

2,194,161

UNITED STATES PATENT OFFICE 2,194,161

FOLDABLE TRICYCLE

Chester L. Cobb, Portland, Maine

Application January 14, 1939, Serial No. 251,026

3 Claims. (Cl. 280—287)

The invention hereinafter to be described relates, in general terms, to tricycle construction, but deals more particularly with improvements in these three-wheel vehicles which permit of their being compactly folded and more easily carried about when not in use for transportation purposes.

The ordinary type of tricycle is primarily made for use by young folks, and its two rear wheels, although necessary for stabilizing the device, makes it more or less of a bulky, space-consuming affair.

More especially when the tricycle is to be carried from place to place, say in an automobile, does its bulkiness become apparent, and often it is a problem to know where and how to store it therein. Moreover, in the matter of factory or store shipments, much space is consumed which otherwise might be conserved. And this applies equally as well in the average home where space is often at a premium, particularly in apartments where room to store such articles is seldom available.

Taking cognizance of the foregoing shortcomings of the conventional type of tricycle, I have evolved ideas in the design and construction of small transportation devices embodying foldable parts which converts them into compact structures when completely collapsed.

Furthermore, the parts are so constructed and arranged that it becomes a very simple and quickly attended to matter to change from the form in which the tricycle will be used, to that in which it is fully folded or compacted.

The invention consists, primarily, in the parts-folding features, and to accomplish the objects sought I divide the rear wheel-supporting structure into two parts, each of which I call a half-axle. The inner ends of these half-axles are pivotally connected to the central frame of the tricycle, then by mounting the rear ground-wheels on swivelling blocks I am enabled to fold the wheels on the half-axles, and the half-axles themselves on the main frame, bringing the swinging parts very compactly together.

Further than this, by incorporating rotatable structure on the inner ends of the handle-bars, these elements may be swung into very close relation to the fork of the tricycle.

For a clearer understanding of the import of my invention reference should be had to the description thereof, found in the following specification when taken in connection with the accompanying drawings in which like reference characters are employed to identify like parts in all the different views thereof.

In the drawings,

Fig. 1 is a side elevation of a tricycle in which is embodied my present invention, the parts being shown in their extended or operative positions;

Fig. 2 is like Fig. 1 except that the parts are shown in their fully collapsed positions;

Fig. 3 is a plan view of the tricycle with the parts folded;

Fig. 4 is a plan view of the tricycle with the parts in their fully extended positions;

Fig. 5 is a fragmentary, front elevation of the tricycle, showing one handle-bar extended and the other folded;

Fig. 6 is a sectional view of the inner end of the handlebar, taken on line 6—6, Fig. 4;

Fig. 6a is an enlarged perspective view of the inner end of one of the handle-bars;

Fig. 7 is a rear elevation of the tricycle, the view showing one of the half-axle assemblies (left side) in fully extended position, and the other (right side) in folded position;

Fig. 7a is an enlarged section taken on line 7a—7a, Fig. 4;

Fig. 8 shows a fragmentary side view of the main frame with a half-axle assembly partially housed therein, the rear ground-wheel in this instance being omitted; and, Figs. 9 and 10 represent perspective views taken at different angles, respectively, of the swivelling block on which the rear ground wheel is mounted.

Referring to the drawings, 1 is the main, central frame of the tricycle, 2 is the front ground-wheel, and 3, 3 the rear ground wheels.

On the lower end of the fork 4 are two pedals 5, and on the upper end of the fork is the steering head structure 6 within which rotates the steering post 7. The seat is shown at S.

All of the foregoing elements are more or less conventional in character, and conform to usual practice in tricycle construction except as will hereinafter be pointed out.

Projecting outwardly from the steering-post 7 is a shank element 7b, secured to which are two handle-bar guiding plates 8. The plates are separated by a spacer 8x through which a reduced portion 7c of the shank 7b extends, the parts being mutually secured by any approved means, as for instance, by upsetting or rivetting the end of the shank, drawing the plates together, or by electric welding to make them integral.

Swingingly mounted between the plates 8, on pivot pins 9, respectively, are the two handle-bars 10 in the inner end of each of which is a bore 11, and on each side, running into each bore, are longitudinal slots 12.

In the bore 11 is a plug 13 and extending through the plug and through the two slots 12 is a handle-bar locking-pin 14. On each end of the pin 14 is a head 15 with which to actuate the pin when folding or unfolding the handle-bars.

The faces on the plates 8, at the points $x$, are arcuate, and on them are cut notches 8a and 8b, the locking-pin 14 registering in notch 8a when the handle-bar is extended, as shown in Figs. 1 and 4, and in notch 8b when it is swung into folded position, as disclosed in Fig. 2 and on the left-hand side of Fig. 5. A spring 16 in the bore 11 thrusts on the plug 13 and normally and yieldingly holds the handle-bar locking-pin 14 in whichever one of the depressions 8a or 8b it is seated.

As was the case with the handle-bar construction, the rear end of my tricycle is foldable, and as the structure on one side of the main, central frame 1 is similar to that on the other side, a description of the elements embodied in one of the half-axles will suffice for that of the other.

The main frame 1 of the tricycle is preferably made in I-beam form in cross section, and each half-axle 17 is made channel shape. Each half-axle is pivoted to, and disposed between, the two extended flange portions 1a of the main frame 1. Connection is made between half-axle and frame by the pivot pin 18, as shown in Figs. 7 and 8.

The side and upper edges of each flange 1a is arcuate shape, and on the faces of these arcuate portions are cut notches, or open-end slots 1b, and approximately ninety degrees from the slots 1b are other slots 1c characterized by their being cut obliquely to a radial line through pivotal point 18, as well also as being made somewhat deeper than the slots above, 1b.

On each of the downstanding flanges 17a of the half-axles 17 is a closed-end slot 19, and in these slots operate axle-locking pins 20, having on each end thereof a head 21 with which the pin is withdrawn from out of the slots or depressions 1b and 1c.

Springs 22 automatically force the pins 20 into, and maintain them in engagement with, the notches 1b and 1c when the half-axles are disposed in either their fully extended or fully folded positions, the left-hand side of Fig. 7 showing the half-axle extended, and the right-hand side depicting the half-axle in its folded position.

By reason of the obliquity of the open-end slots 1c, the pins 20 are more securely held against displacement therefrom when excessive pressure is applied to the rear end of the tricycle than would be the case were the slots cut radial. In fact, the more weight or pressure which the tricycle has to support, the greater the tendency of the pins to remain seated in the bottom of the slots.

In folding the half-axle into its compacted position, as shown at the right in Fig. 7, the half-axle locking pin 20 is first withdrawn from the open end slots 1c in the frame, by moving the pin outwardly along the closed-end slot 19 in the half-axle.

After the pin 20 is clear of the slot 1c the half-axle 17 may be swung upwardly, from the position shown at the left to that shown at the right, in Fig. 7, or as indicated by arrow A, the locking-pin 20 riding the arcuate surfaces $y$ of the flanges 1a, until it automatically is drawn into the slot 1b by the tension of the springs 22.

But the foregoing procedure cannot be fully carried out until the rear ground wheel 3 has been folded beneath or on the outside of the half-axle 17.

The outer end of the half-axle has a jointed connection with the ground wheel 3 through a swivelling block 24, shown in the two perspective views thereof in Figs. 9 and 10 respectively.

This swivelling block has pivotal connection with the half-axle on the pin 25, and in its arcuate face $z$ is an open-end slot or depression 24a with which the ground-wheel locking-pin 26 registers when the ground wheel 3 is disposed in the position it assumes at the left of the view shown in Fig. 7. To maintain the locking-pin 26 in the above mentioned position, also shown in sectional view in Fig. 7a, a spring 28, or other equivalent means, is employed, one end of the spring being fixedly secured over the pivot pin 25, and yieldingly acting to draw the pin 26, having heads 27, into the notches 24a.

To fold the ground-wheel 3 into its collapsed position, as shown at the right of Fig. 7, the locking-pin 26 is moved inwardly along the two side slots 29 in the downstanding flanges 17a of the half-axle, and upon complete release of the pin 25 from the slots 24a the ground wheel may be swung under the half-axle, or as it is shown at the right in Fig. 7, in parallelism therewith. During this movement the pin 26 rides the arcuate surfaces $z$ until the locking-pin automatically snaps into the open-end slots 24b, yieldingly maintaining the wheel in this position.

By reference to Figs. 7 and 8 it will be observed that the swinging half-axles when folded are partially housed within the spaces between the flanges of the I-beam shape main frame 1. This has the effect of bringing the rear end parts of the tricycle into very compact form, transversely thereof.

To fold the parts and relocate them in fully collapsed positions, or from those shown in Fig. 1 to those depicted in Fig. 2, the following operations are performed:

The rear wheel locking-pins 26 are first released from their engagement with the open-end slots 24a, permitting the ground wheels 3 to swing on the swivelling block 24 into parallelism with the half-axles; the half-axle locking-pins 20 are next released from the open-end slots 1c which allows the half-axles to be swung upwardly into parallelism with the main frame 1, and partly housed therein; the front ground wheel 2 is now swung backwardly through an arc of 180 degrees, bringing the handle-bars into positions directly opposite to those in which they are operatively disposed, and lastly, the handle-bar locking-pins 14 are withdrawn from their engaging, open-end slots 8a and the handle-bars themselves swung downwardly into close relation with the fork of the tricycle. The vehicle now appears as seen in Fig. 2. The whole operation required to change the parts from their operative positions to their fully collapsed ones takes practically a no longer period of time than it takes to repeat these instructions for doing the work.

The rear ground wheels are shown mounted on headed gudgeons 3a. In practice they will, in all probability, be equipped with ball or roller bearings. In Fig. 2 I have shown in dot and dash lines a pedal 5. This is to disclose the fact that when all parts are folded, the wheel 2 may revolve without conflict between the handle-bars and pedals.

The advantages accruing from a construction which permits of the parts of the tricycle to be substantially condensed into the form herein proposed seem quite obvious.

In the household, the ability to thus compact the device will strongly appeal to the mother or attendant of a young child, especially where the problem of disposing of the child's playthings is already a perplexing problem, and the addition of a space-consuming affair, like a non-foldable tricycle, only adds to their difficulties.

In the case of the manufacturer, the cost of packaging my folding tricycle will greatly reduce one item of expense in his overhead; and the merchant, dealing in such devices, will appreciate the room thus released to him when handling this particular type of product.

The embodiment of my device, as herein described, I consider preferred construction. I wish it to be understood, however, that I do not limit or restrict myself to the exact mechanical details as have been set forth, as the disclosure is illustrative in character, and the invention, obviously, might be carried out in various other forms of structure, provided that any deviation from the form disclosed is in accord with the meaning and intent of the invention and falls within the scope of the subjoined claims.

What I claim is:

1. A foldable tricycle comprising in combination with two rear ground wheels an I-beam-shape main frame, lateral portions extending from the flanges of said I-beam-shape main frame on its lower end and on each side thereof, said lateral extensions having arcuate faces thereon, locking-pin-engaging notches cut in said arcuate faces, substantially ninety degrees apart, two channel-shape half-axle members pivotally secured at one end to said main frame and disposed, respectively, between the laterally-extending portions on each side of the main frame, a swivelling block making pivotal connection with the outer end of each of said half-axles, said swivelling block having arcuate faces thereon, locking-pin-engaging notches cut substantially ninety degrees apart on the arcuate faces of said swivelling block, a locking-pin adapted to hold said half-axle in either one of two positions, extended and folded, when in engagement with the said notches in the laterally extended portions on said main frame, and a locking-pin adapted to engage the notches in the arcuate faces of said swivelling-block for securing said swivelling-block against rotation on said half-axle when disposed in either one of two positions substantially ninety degrees apart.

2. In a foldable vehicle of the tricycle type the combination with two rear ground wheels, of a main frame symmetrical as to form on both sides of a central, vertical, longitudinal plane therethrough, mutually spaced flanges extending laterally from, and disposed on the lower end of, said main frame, said flanges having arcuate faces thereon, a half-axle element pivotally connected to, and disposed on each side of, said main frame, between said flanges, a yieldably mounted locking-pin in said half-axle, two oppositely disposed locking-pin notches in the arcuate faces of said lateral flanges, said notches being cut obliquely to a radial line from the pivotal point of said half-axle, said notches adapted to be engaged by said locking-pin to hold said half-axle in fully extended position, two other oppositely-disposed locking-pin notches in said arcuate faces adapted to receive said locking-pin and hold said half-axle in fully folded position when swung upwardly thereinto, a swivelling-block element pivotally secured on and adapted to swing from the free end of each of said half-axles, means for mounting one of said rear ground wheels for rotation on said swivelling-block element, and a locking-pin to secure said swivelling-block in either one of two positions on said half-axle, substantially ninety degrees apart.

3. A foldable tricycle having collapsible handle bars comprising in combination a main frame of I-beam construction, axle-carrying flanges extending outwardly from the main frame on both sides and at the lower end thereof, two axle pivoting pins interconnecting and passing through the two extended flanges on each side, respectively, of the main frame, two locking-pin notches cut in the peripheral portions of said extended flanges, spaced substantially ninety degrees apart, the lower notches being cut non-radially, a concentric portion on the periphery of said extended flanges extending from the upper to the lower notches, two channel-shape half-axles, the inner ends of which are adapted to swing, respectively, from said pivot pins, each half-axle having longitudinal slots in its downstanding flanges adjacent its pivotal point of connection with said main frame, a locking-pin operable in said slots, adapted when said half-axle is extended to engage the lower notches, and when the half-axle is folded, to engage the said upper notches, said half-axles when folded being disposed in close relation to the web portion of said main frame and partially enclosed by the flanges thereof, and means adapted to yieldingly maintain said locking-pins in the said notches when seated therein.

CHESTER L. COBB.